Aug. 29, 1961 G. M. MAST ET AL 2,998,188

UNIVERSAL COUNTER

Filed Feb. 18, 1957 4 Sheets-Sheet 1

INVENTORS
G. M. MAST
W. K. GANNETT
W. A. TAYLOR

BY [signature]

ATTORNEY

INVENTORS
G. M. MAST
W. K. GANNETT
W. A. TAYLOR
BY
ATTORNEY

INVENTORS
G. M. MAST
W. K. GANNETT
W. A. TAYLOR
BY
ATTORNEY

UNIVERSAL COUNTER

Filed Feb. 18, 1957 4 Sheets-Sheet 4

INVENTORS
G. M. MAST
W. K. GANNETT
W. A. TAYLOR
BY
ATTORNEY

United States Patent Office
2,998,188
Patented Aug. 29, 1961

2,998,188

UNIVERSAL COUNTER

Gifford M. Mast and Wright K. Gannett, Davenport, and Wesley A. Taylor, Bettendorf, Iowa, assignors to Mast Development Company, Davenport, Iowa, a corporation of Iowa Filed Feb. 18, 1957, Ser. No. 640,823
13 Claims. (Cl. 235—92)

This invention relates to an electric counter and more particularly to improved circuitry, actuators and a novel combination of components affording wide flexibility of the counter to the end that it is capacitated for counting, resetting, presetting, transferring and predetermining.

By way of preliminary definition, it should be observed that the terms referred to above are used here as having the following meanings: resetting is the function of returning all counter wheels or members to zero; presetting is the preliminary setting of the counter wheels at any desired number from which the wheels may advance or reverse; predetermining involves a preselection of the number at which it is desired that the counter actuate some form of responsive means such as a signal, cut-off etc. Counting and transferring are fundamental operations and require no definition here.

It is a significant object of the invention to afford an improved electrical system including count, reset, hold and transfer circuits, and particularly to utilize the transfer and hold circuits as parts of a single basic circuit; in other words, to arrange a circuit or parts thereof to perform at least two functions. The invention has for a further important object the addition to the above circuit of a predetermining circuit, preferably operative through series switches incorporated in or actuated by predetermining wheels or members associated with the counter wheels or members in such manner that any predetermined number within the capacity of the counter may be preselected. Still another important object of the invention is to utilize electric actuators or pulsators so arranged that the members driven as a result thereof receive their driving force by deenergization of the pulsators. This enables the use of a nested arrangement of actuators by means of which several such actuators may be compactly arranged in a minimum of space. As a subsidiary feature, the counter or equivalent members are so associated with the actuators that every other member moves in one direction while alternate or intervening members move in the opposite direction.

Still further and nonetheless major objects reside in improved electrical devices combining the advantages of a clapper type actuator with a solenoid or straight plunger type; such device having its plunger or movable member counterweighted; improved means for locally resetting the counter members to zero; a combined local and remote control arrangement in which many of the foregoing functions can be achieved locally at the counter or remotely from a control panel; and such other important objects and desirable features as will become apparent from the ensuing description of preferred embodiments of the invention as disclosed in the accompanying drawings, the several figures of which are described below.

Figures 1, 7, 8, 9, 10:
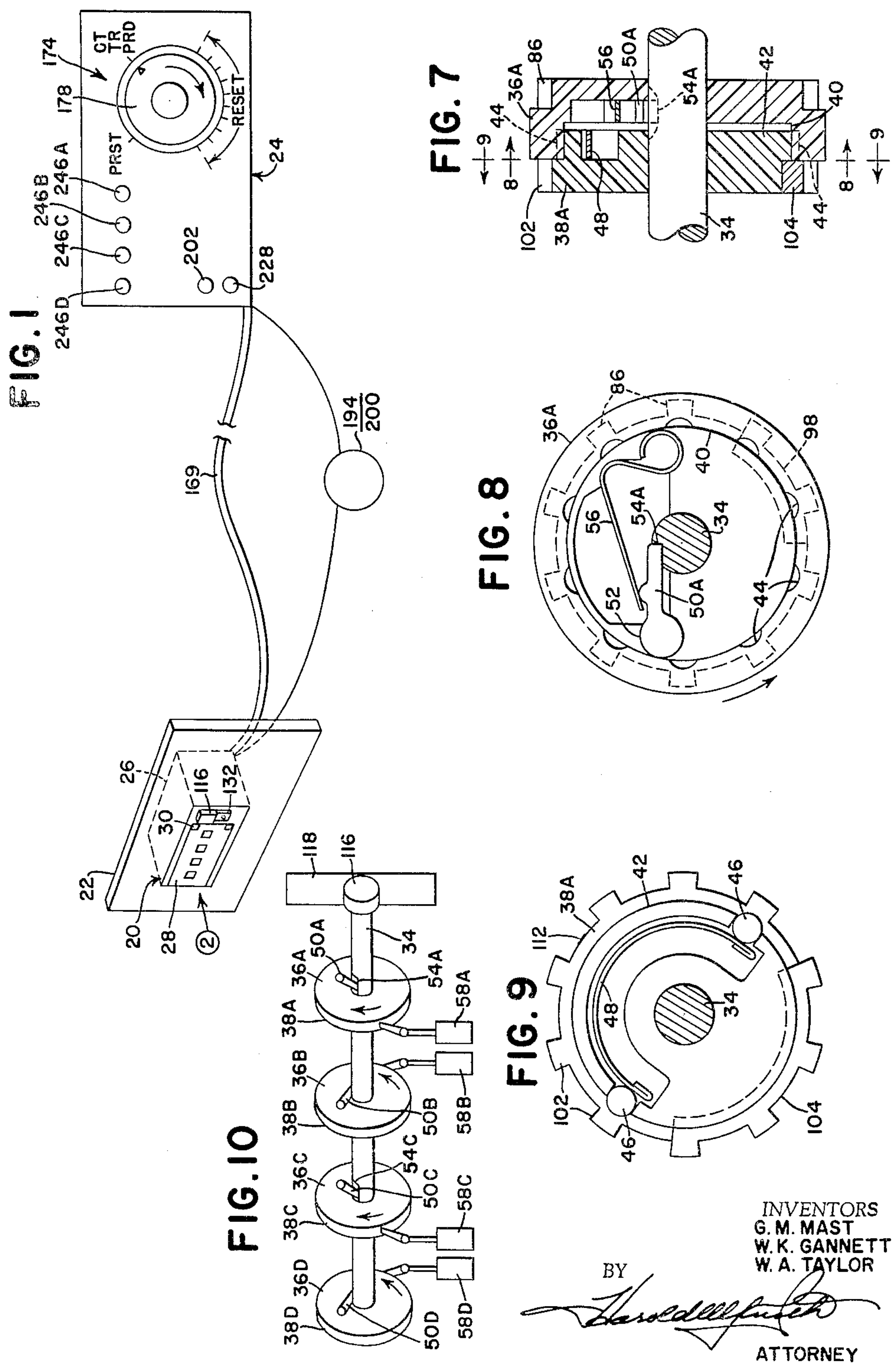
FIGURE 1 is a pictorial illustration of a representative counter and its associated remote control panel.
FIGURE 7 is an enlarged section on the line 7—7 of FIGURE 4.
FIGURE 8 is a view of the back side of one counter wheel as would be seen on the line 8—8 of FIGURE 7 with the predetermining wheel removed.
FIGURE 9 is a view of the predetermining wheel as would be seen along the line 9—9 of FIGURE 7 with the counter wheel removed.
FIGURE 10 is a schematic perspective of the overall arrangement of the wheels, shaft, manual reset means and electrical actuators.
Figure 14:
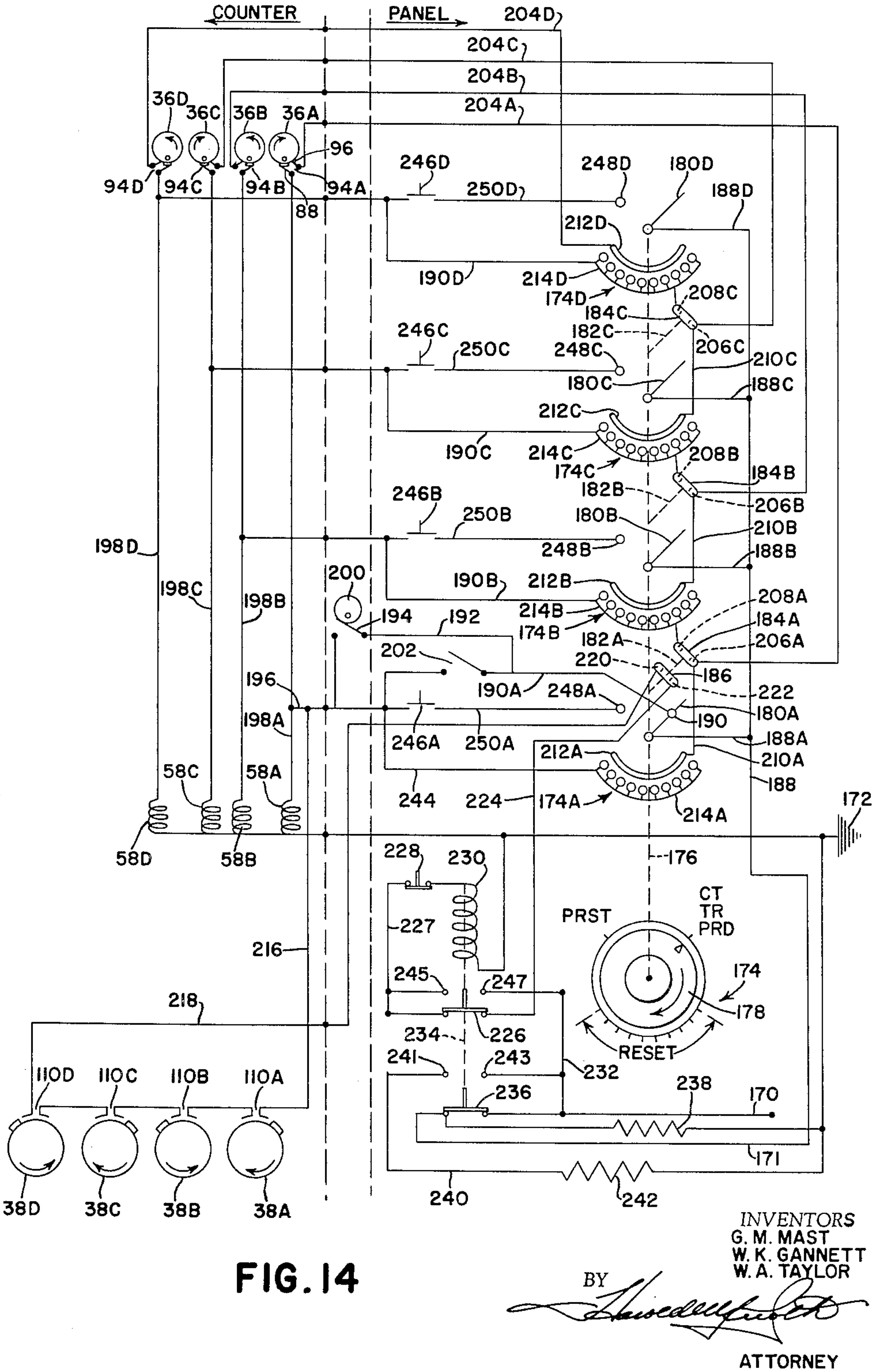
FIGURE 14 is a wiring diagram including schematically depicted activating components.

As best seen in FIGURE 1, the system includes a counter 20 here shown by way of example as being supported in a panel 22, which may be set up in any desired relation to the input means that furnishes the pulses or activations to be counted, and a remote control panel 24 by means of which the counter mechanism may be remotely controlled through the medium of an electrical circuit system shown in FIGURE 14. It should be understood that the illustrated mounting of the counter in the panel 22 does not exclude other arrangements. The counter or counter mechanism 20 is itself embodied in a compact sub-housing or support 26, carried by the panel 22, and available for manual control via a hinged window 28, hinged at 30 and latched at 32. The counter shown is of the four-digit type having number positions A, B, C and D representing respectively the digits, tens, hundreds and thousands and of course capable of counting up to 9999. At this point it should be observed that the expressions "counter," "numbers," etc., are used here as well as in the claims as terms of convenience and not of limitation, since obviously other indicia could be employed, or the counter itself could employ a system based on other than transfer at tens.

A main shaft 34, which functions as a reset shaft as well as means for journalling counter and predetermining wheels, is appropriately journaled in the sub-housing. A plurality, here four, of counter members or wheels 36A, 36B, 36C and 36D are angularly movably carried by the shaft 34, as are four predetermining wheels 38A, 38B, 38C and 38D, one for and alongside each counter wheel, it being understood that the predetermining wheels are individually angularly movable and settable relative to the counter wheels. Each pair of wheels, as 36A and 38A, is interconnected by releasable means such as is best shown in FIGURES 7, 8 and 9, wherein it is evident that the wheel 36A is recessed at one side at 40 to receive an annular reduced portion 42 of the adjacent predetermining wheel 38A. The inner periphery of the circular recess 40 is provided with a plurality of notches 44 (here ten to accord with the number of numerals or angular positions of the wheels) and these notches are selectively adapted to receive detent means comprising a pair of diametrically opposed detent balls 46 carried in appropriate apertures in the hub 42 of the wheel 38A and spring loaded by an arcuate spring 48. The detent means is sufficient to enable the paired wheels 36A—38A to rotate in unison when the counter wheel is driven clockwise (FIGURE 10) but when the wheel 36A is held, as against counterclockwise turning (clockwise in FIGURE 8), the wheel 38A may be forcibly turned in the antidriven direction. The purpose of this arrangement is to enable the angular register of the paired wheels to be altered for predetermining purposes. For example, as will be brought out below, the predetermining wheel is capacitated to activate a responder (to be described below) when the paired counter wheel reaches a certain predetermined angular position or number. If the starting position of the counter wheel is considered as zero and the starting position of the predetermining wheel is also zero, then the two starting positions register and activation of the responder will depend upon the angular distance from zero to some actuating device angularly spaced on the predetermining wheel. By changing the angular position of the predetermining wheel relative to the counter wheel, activation of the responder can be accelerated or made to occur in fewer angular increments of advance of the associated counter wheel. As will be readily apparent, the present disclosure is based on a counter of the additive type, but the same principles are obviously applicable, for example, to a subtractive counter. Hence, directions of rotation referred to herein in terms of "advance" are not exclusive of appropriate definition when applied to subtractive counters or equivalent mechanisms.

Although detent means for the other paired wheels 36B—38B, 36C—38C and 36D—38D are not shown, it will be clear that there are such means and that they are similar to the detent means just described for the wheels 36A—38A.

Figure 4:
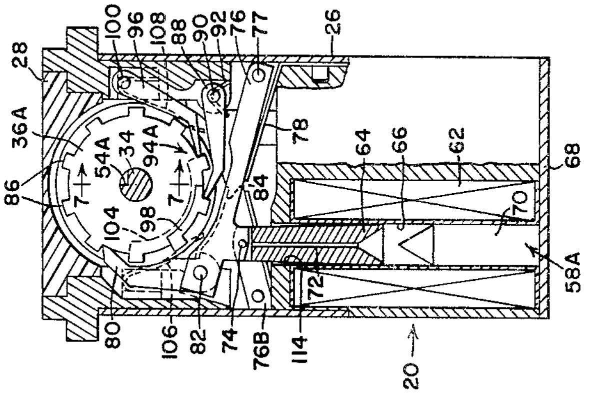
FIGURE 4 is a section as seen substantially along the line 4—4 of FIGURE 2.
Figure 6:
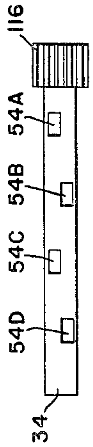
FIGURE 6 is an elevation of the shaft per se that carries the counter and predetermining wheels.

The wheel 36A is carried on the shaft 34 for normal rotation (here advance) in a clockwise direction as seen in FIGURES 4, 10 and 14, and for that purpose includes an overrunning or one-way clutch device comprising a pawl 50A pivoted to the wheel at 52 and cooperative with a lug or milled recess 54A in the proximate portion of the shaft 34. The pawl is spring loaded at 56 and when the shaft 34 is held and the wheel turned counterclockwise as seen in FIGURE 8, the pawl will overrun the lug 54A. Likewise, when the shaft 34 is turned counterclockwise as seen in FIGURE 8, the lug will drive the wheel through the pawl. As seen in FIGURES 4, 10 and 14, the above directional characteristics are just the opposite. Also as seen in FIGURE 10, the wheels 36B, 36C and 36D respectively have pawls 50B, 50C and 50D cooperative respectively with shaft lugs 54B, 54C and 54D (FIGURE 6).

As stated, the wheel 36A is mounted for normal clockwise advance as seen in FIGURES 4, 10 and 14, as is the wheel 36C. The wheels 36B and 36D normally advance in the opposite direction. Although the numerals or equivalent indicia are not fully marked on the respective wheels, it will be understood that the numerical progression in each case accommodates the direction of advance of the respective wheel. Since alternate wheels rotate in opposite directions, the pawls and lugs are appropriately arranged, as will be evident from FIGURES 6 and 10.

Figure 11:
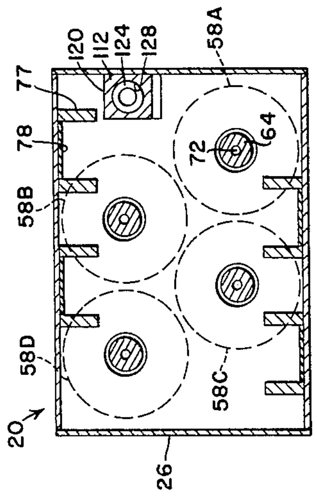
FIGURE 11 is a section as seen along the line 11—11 of FIGURE 3.

Advance of the counter wheels 36A, B, C and D is individually effected by power furnished in the first instance by electrical actuators 58A, 58B, 58C and 58D, arranged in nested relationship (FIGURE 11), which is made possible by placing a pair of actuators at each side of a plane including the axis of the shaft 34. This disposition shortens the overall dimension as measured along the shaft axis, since the axial distance between the actuators 58A and 58B, for example, is materially less than the diameter of an actuator. Likewise, the cross dimension between the named two actuators is less than an actuator diameter. The arrangement is admirably accommodated by the alternate advancement of the wheels. Although the counter mechanism thus afforded is neat and compact, adequate provision is made to guard against friction, interference among the wheels, etc. as by the use of appropriate materials for bearings (not shown) and spacers as at 60.

Since the actuators are identical, only the actuator 58A will be described in detail. This actuator is of the solenoid type, having a body or coil 62 and a plunger or armature 64 carried in a typical non-magnetic sleeve or bore 66 in the coil. The bottom of the coil support 68, which is of magnetic material, has a typical conical plug 70 and the bottom of the plunger is conically recessed; the plunger is also vented by an axial bore 72 to prevent the entrapment of air. The free end of the plunger is pivotally connected at 74 to a clapper or arm 76 which is hinged at 77 to the coil support and biased by a spring 78 in an upward direction. When the coil is energized, the plunger is retracted to draw the clapper downwardly with it so as to stress the spring 78 so that upon deenergization of the coil the spring snaps the clapper upwardly. Stated otherwise, the drive established by the clapper and a counter-wheel-engaging drive pawl 80 is cocked and then released by energizing and deenergizing of the actuator. The pawl 80 is pivoted to the free end of the arm or clapper at 82 and is biased into engagement with the wheel 36A by a spring 84, whereby the pawl may yield and be overrun by the teeth 86 on the wheel when the wheel is rotated clockwise (FIGURE 4) as during reset but may drive the wheel through the teeth when the actuator and drive are actuated.

As the wheel 36A advances, a second pawl 88, pivoted at 90 and biased by a spring 92, ratchets over the teeth 86 and at a predetermined position of the wheel operates as part of an electrical switch 94A (FIGURE 14), which includes a third pawl 96 and an arcuate conductor 98 that forms a segment of the wheel 36A, the remainder of the wheel being a non-conductor. The third pawl 96 is pivoted at 100 on the counter support 26 and ratchets over the teeth 86 as the wheel 36A rotates, ultimately being bridged as respects the pawl 88 by the conductor 98 on the wheel to close the switch for purposes to appear subsequently.

It should be clear from the foregoing that each actuator includes drive means including a pawl like the drive pawl 80 for the wheel 36A, plus conductor or contact pawls like those at 88 and 96 and that each counter wheel includes a conductor like that at 98 for effectuating other switches like that at 94A, which other switches appear at 94B, 94C and 94D in FIGURE 14. It is deemed sufficient to disclose and refer to these details as above in the interests of brevity and clarity. Certain of the additional components are however visible in actual structural form, particularly in FIGURE 3, wherein there will be seen, for example, the counterparts 88B, 96B and 80C of the pawls 88, 96 and 80, respectively, from which the remaining visible structure can be readily identified as belonging to the respective actuators, drive means and switches. Visible in FIGURE 4 is a clapper 76B, which is the counterpart of the clapper 76 already described. The foregoing, plus the obvious symmetry of the mechanism renders detailed elaboration unnecessary.

The predetermining wheel 38A, like the counter wheels, is essentially a non-conductor and has integral teeth 102 except for a toothed conductor insert 104 which, with a pair of contacts 106 and 108, comprises a predetermining switch 110A (FIGURE 14). Similar switches are achieved for the other predetermining wheels 38B, 38C and 38D, identified in FIGURE 14 at 110B, 110C and 110D. Since these are all identical, or at least symmetrical because of the alternately opposite directions of rotation of the wheels, a description of the switch 110A for the wheel 38A will suffice, reference being had primarily to FIGURES 3 and 4, which show that the conductors 106 and 108 are mounted at opposite portions of the support 26 to be spanned or bridged by the wheel conductor 104 at a certain angular position of the wheel. In the present case, the conductor 104 is positioned diametrically opposite a marked space or identification dot 112 on the wheel 38A, which identification may of course be of any other type. The arcuate conductor 98 on the counter wheel 36A is arranged to make or bridge the two conductor pawls 88 and 96 and thus to close the switch 94A when the counter wheel reaches that angular position based on the numeral nine where the counter wheel is numbered from zero through nine. Accordingly, if the predetermining wheel is detented to the counter wheel with the identification dot 112 in register with the nine on the numbered counter wheel, both switches 94A and 110A, normally open, will close at the nine position of the counter wheel. The other paired wheels 36B—38B, 36C—38C and 36D—38D are similarly set up and the other switches 94B, C and D and 110B, C and D operate like the switches 94A and 110A. In short, the presence of all dots in the window means that the predetermining circuit is closed.

From the description thus far, it will be seen that energizing of each actuator cocks its associated drive means and deenergizing of the actuator releases the drive means to advance the associated wheel. In this respect, it is important to note that the switch 94A, for example, closes then upon deenergization of the actuator 58A as distinguished from energization, which is significant in the transfer phase of the operation of the system, as will be brought out below. Also of importance, is the arrangement of the core-to-clapper mounting at 64—76. Since the plunger is normally movable in a straight line and the free end of the clapper is compelled to travel in an arc about the pivot or hinge 77, provision must be made to accommodate the conflict. According to the present invention, the plunger 64 is tapered at 114 to enable the necessary amount of rocking thereof transverse to its normal axis without losing its efficiency. As a matter of fact, the efficiency of the actuator is increased by combining the plunger and clapper advantages in the same actuator, because the mechanical benefits are obtained from use of the clapper or arm and the electrical advantages of the plunger are simultaneously exploited. The same applies of course to the other actuators.

Figures 2, 3:
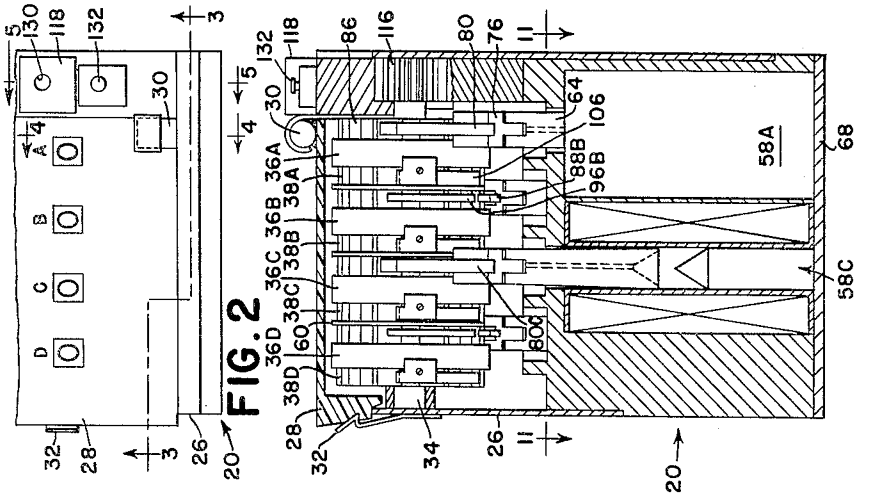
FIGURE 2 is an enlarged elevation of the counter window portion of the counter as seen in the direction of the arrow bearing the encircled numeral 2 in FIGURE 1.
FIGURE 3 is a section as seen generally along the line 3—3 of FIGURE 2.
Figure 5:
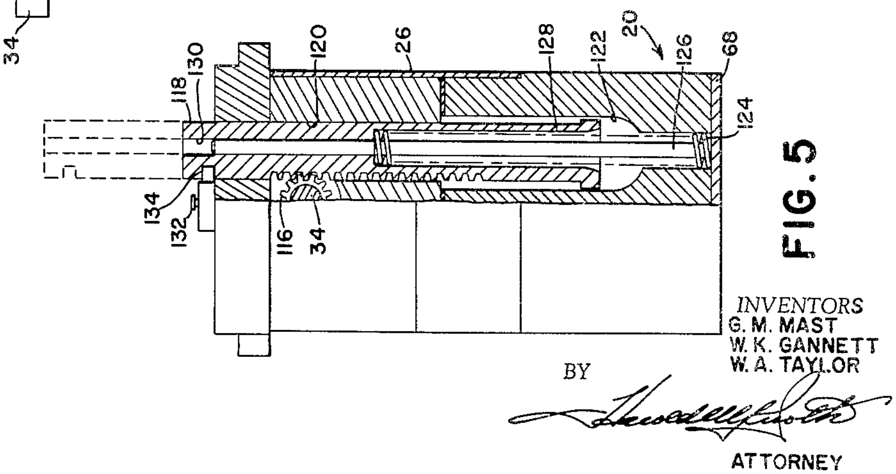
FIGURE 5 is a section on the line 5—5 of FIGURE 2.

Local reset of the wheels 36A, B, C and D is accomplished at the counter by reset means comprising a pinion 116, keyed or otherwise fixed to the right-hand end of the reset shaft 34, and a rack 118, appropriately slidably mounted, as at 120, in the housing or support 26, the lower portion of the actuator support 68 being recessed at 122 to accommodate the lower end portion of the rack (FIGURE 5). The rack is in constant mesh with the pinion 116 and is spring-loaded or biased upwardly by a compression spring 124 which encircles a guide rod 126 and which is housed in the rack at 128. The rod is fixed to the portion 68 and is slidable in a bore 130 in the rack. The plunger is releasably locked in its down or depressed position by a latch 132 which is engageable with or disengageable from a latch-receiving notch 134 in the rack. The latch is located conveniently to the hinged counter window 28 (FIGURES 1, 2 and 3). As previously described, alternate counter wheels rotate in opposite directions. Hence, extension or upward movement of the rack by the compression spring 124 when the latch 132 is released rotates the reset shaft 34, via the pinion 116, in a counterclockwise direction through 360° to reset the counter wheels 36B and 36D (FIGURES 4, 5 and 10), and return or depression of the rack reverses the reset shaft through 360° and resets the counter wheels 36A and 36C, after which the rack is relatched at 132. It should be noted that when the latch 132 is released, the spring 124 will drive the rack upwardly and all that is required to complete the reset is to return the rack and relatch it. In short, one-half of the reset operation is accomplished by the spring 124. The rack and pinion relationship is such as to achieve reset simply and automatically in the fashion described without requiring viewing of the counter window to determine whether the reset operation is complete. It will be clear that as the reset shaft turns in one direction to reset one pair of counter wheels, the pawls of the other pair of counter wheels overrun the associated shaft lugs and vice versa. Also, regardless of the angular position of any counter wheel, the reset shaft when turned and reversed will pick it up via the pawl and lug clutch device and return it to zero. As already indicated, since the rack and pinion mechanism is carried by the counter, it affords manual means for accomplishing reset locally.

The predetermining operation is accomplished locally (at the counter) by opening the counter window 28 and manually advancing the desired predetermining wheels in selected amounts. It should be noted however, that since the counter wheels advance alternately in opposite directions (FIGURE 10), so must the respective predetermining wheels be manually moved alternately in opposite angular directions. For example, the position of the reset shaft 34 is fixed by the engagement of the pinion 116 with the latched rack 118. Because of the several pawls, the counter wheels 36A and 36C cannot turn counterclockwise relative to the reset shaft; hence, the predetermining wheels 38A and 38B must be turned counterclockwise. Just the reverse is true of the paired wheels 36B—38B and 36D—38D. Selected movement of a predetermining wheel relative to its associated counter wheel may be accomplished by engaging the predetermining wheel teeth with an appropriate instrument, such as the point of a pencil. As a safeguard against turning the predetermining wheel in the wrong direction the predetermining wheel teeth 102 or the spaces therebetween may be marked with arrows, or the teeth may be ramped or otherwise shaped to compel proper rotation, all of which are details that will readily suggest themselves on the basis of the broad principles disclosed.

Manual preset of the counter wheels is just as easily achieved via the opened counter window 28, since the counter wheels can be rotated in only their respective advance directions, being prevented from reverse rotation by the engaged pawls. Hence, an appropriate instrument, again such as the point of a pencil, will serve, by engagement with the counter wheel teeth, to advance the respective wheel to a selected preset position from which the wheel will automatically advance or count when driven electrically by the associated actuator and electrical system to be presently described.

Figure 13:
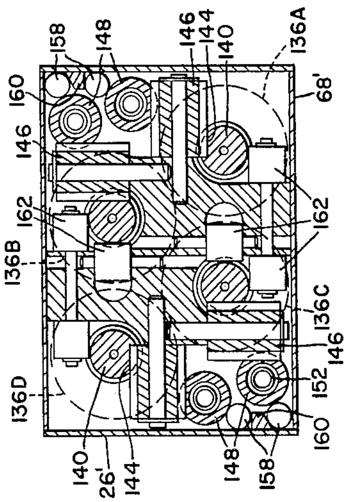
FIGURE 13 is a section as seen substantially along the line 13—13 of FIGURE 12.
Figure 12:
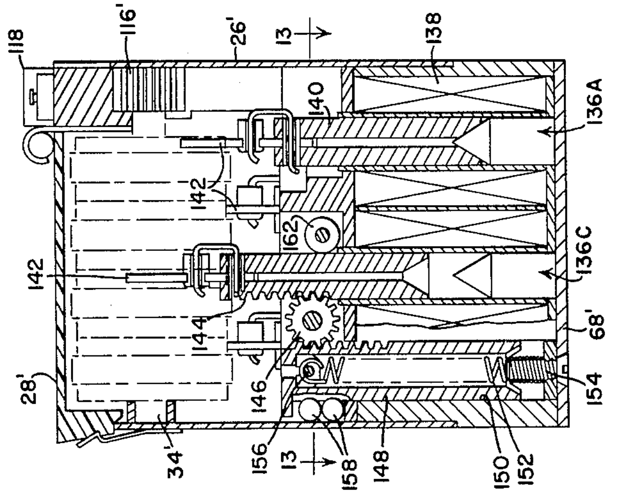
FIGURE 12 is a section similar to FIGURE 3 but showing a modified arrangement.

FIGURES 12 and 13 show a modified actuator arrangement, retaining however the utilization of the principle of nesting the actuators. For the purpose of distinguishing this modification from that previously described, the four actuators are identified by the numerals 136A, 136B, 136C and 136D, carried in a sub-housing or support 26'. This support, like that at 26, has a hinged window 28' behind or below which is carried a set of four each of counter wheels and predetermining wheels. For the sake of simplicity, this series is shown in broken lines in FIGURE 12, since the details need not be repeated. This series of wheels is mounted on a reset shaft 34' which is reset by a pinion 116' and rack 118'. The rack 118' is considerably shorter than the rack 118 because of space limitations but its toothed range and rack-to-pinion ratio is adequate to accomplish reset in the same manner as that described for the rack 118. Again, the differences in this respect are not material to the preset disclosure and are mentioned merely because of apparent differences in the illustrations thereof.

The actuators 136A, B, C and D are identical, each having a body or coil 138 and a plunger 140, and each plunger carries a wheel-driving pawl 142 which has the same function as the driving pawl 80 described earlier herein. Each plunger is provided at one upright side thereof with rack teeth 144 which are in constant mesh with one diametrical side of a pinion 146, the opposite side of which is in constant mesh with the rack teeth of a counterweight 148 of non-magnetic materials such as brass, carried in a bore 150 parallel to the associated plunger. The racks and pinion mechanism affords means by which the plunger and associated weight travel in opposite directions. Here again, advance of the associated counter wheel is effected by deenergization of the actuator, energizing thereof being used to cock the drive represented here by the pawl 142. Hence, the plunger is extended by deenergizing of the actuator, the weight being hollow and housing a tension spring 152 which is anchored at 154 to the magnetic base 68′ and which is connected at 156 to the weight. Each weight 148, in addition to being carried in its bore 150, is guided by bearings, here in the form of a pair of balls 158 retained at 160. The cores or plungers 140 are guided by rollers 162.

Other than as described above, the actuator arrangement utilizing the counterweights functions just like those at 58A, B, C and D as respects control and advance of the counter wheels. The significant distinctions stem from the balancing of the dynamic forces of the plungers 140 by the weights 148, guiding of the plungers and weights by the bearings and rollers 158 and 162 and the novel arrangement of the rollers, pinions and shafts and the journaling thereof in the compactness that will be readily apparent from an examination of FIGURE 13 in particular.

The mechanism described thus far is contained in or carried by the panel 22 or any other supporting structure, the details of which are not presently material. It should be understood, however, that the actuator mechanism of FIGURES 12 and 13 is an alternate to that of FIGURES 3–5 and 11, and that both are not practicably used in the same counter. In the interests of simplicity, further reference will be made to the design of FIGURES 3–5 and 11; viz., the actuators 58A, B, C and D.

The additional components of the system are, in the main, carried by the control panel 24; although, there are of course certain electrical connections made between the panel and the counter or counter box. In FIGURE 14, a pair of vertical parallel broken lines represents a division between counter or local and panel or remote components, and the heavy dots along the left-hand line just referred to are indicative of terminals on the counter to which the necessary electrical connections are made. In this respect, the illustration is typical only and does not exclude other arrangements. Hence, the terminals need not be described in detail and it may be assumed, apart from the advantages of the remote control as such, that the various circuits extend directly to the actuators 58A, B, C and D, preferably through a cable (as at 169 in FIGURE 1) containing the horizontal lines between the two vertical lines, and to the predetermining switches 110A, B, C and D; the same is true as to the "hold-transfer" switches 94A, B, C and D. In the interests of clarity, the counter and predetermining wheels are shown schematically and separated from their positions of FIGURES 3 and 10, for example, but the above-described structural relationship still exists to enable these wheels to function individually and in relation to each other for achieving the end results of the electrical actuating and control system.

FIGURE 14 bears the words "Counter" and "Panel" to differentiate between the counter and panel as above explained.

The system is connected to a source of electrical energy at 170 and returns to ground at 172, and includes several branch circuits—to be described below—activated and deactivated by selector means designated generally by the numeral 174. This means includes a plurality of subsidiary selector devices or selector switches 174A, B, C and D which, following the letter-identification pattern employed herein, are applicable respectively to the mechanisms and switches for the counter wheel positions A, B, C and D.

The switches 174A, B, C and D include a common shaft 176 which terminates at and is keyed or otherwise secured to a typical knob or controller 178. The panel 24 is suitably marked in dial fashion to indicate the several angular control positions of the selector means, and as shown these markings include "Reset," for the resetting function; "PRST," for the presetting function; and "CT–TR–PRD," for count, transfer and predetermining functions. In the "CT–TR–PRD" position (sometimes hereinafter simply referred to as the "count" position), the selector accommodates three functions: count, transfer and predetermine, as the identification denotes. The "Reset" position is here actually a status including several sub-positions arranged in an arcuate range, which is but representative of several expedients that could be employed. Keyed to or otherwise affixed to the shaft 176 are four conductors or blades 180A, B, C and D, the shaft being a non-conductor as respects these blades. Also affixed to the shaft 176 are three radial non-conductor members 182A, B and C, none being needed for the D position. These members respectively carry conductor wipers 184A, B and C; and the member 182A carries an additional wiper 186. As will subsequently appear, the wipers 184A, B and C are transfer wipers and the wiper 186 is a predetermining wiper.

The blades 180A, B, C and D are fed by branch lines 188A, B, C and D from a main line 188 which is connected to the source 170; and, when the selector means 174 is in its count or CT–TR–PRD position as shown, the blade 180A makes contact with a count contact 190 which is part of a counter circuit 190A that leads to the actuator 58A via 192, a counter switch 194, a line 196 and a line 198A. Input means, represented here typically by a cam 200, furnishes the impulses to be counted and alternately closes and opens the counter switch 194 to pulse the actuator 58A for the digits wheel 36A and to pulse the other actuator successively as the count increases (or decreases in a subtractive counter) by the transfer means to be presently described. A counter line in parallel with the main counter circuit is selectively closable by a normally open switch 202, which may be manually operated to pulse the system remotely, as in case of inadvertent skipping of the impulse means 200 or for any other reason. The secondary switch is represented on the panel by a suitable button or the like (FIGURE 1). At this point it should be observed that the pulsing means 194—200 may be at any desired location as suggested pictorially in FIGURE 1, and that the schematic position thereof in FIGURE 14 is for illustration only.

As previously described, pulsing or energizing and deenergizing of the actuator 58A cocks and releases the drive pawl 80 and incrementally advances the counter wheel 36A. If the counter wheel starts at zero, which is assumed here, the hold-transfer switch 94A is open and will not close until the counter wheel reaches nine, at which time the hold-transfer switch will complete a hold-transfer circuit including the line 198A, connected to the counter wheel conductor pawl 88 (FIGURE 3), and a continuation line 204A, connected to the other counter wheel conductor pawl 96 and leading back to a hold-transfer contact 206A which is at this time bridged with or connected to a contact 208A by the wiper 184A.

Now, it should be recalled that closing of the hold-transfer switch 94A depends not upon the pulsing stroke but upon the release stroke of the pawl 80. That is to say, when the counter wheel 36A is at eight (in the example used here) and the actuator 58A is next energized, the drive pawl 80 is cocked, and when the pulsator 58A is deenergized, the pawl is released to advance the wheel 36A to nine, thus closing the switch 94A. One of the principal advantages gained here is that when the switch 94A is thus closed it has already established the transfer-count circuit for the next wheel actuator 58B so that on the next pulse the drives for both actuators 58A and 58B are cocked and then released as the actuators are deenergized, whereupon the wheel 36A advances to zero and the wheel 36B simultaneously advances to one, for example. Hence, it is the released mechanical drive and not the electrical pulsing that does the actual job of advancing the wheels 36A and B at the same time. This advantage is multiplied in the ultimate advancement of all four wheels 36A, B, C and D in unison.

As stated just above, the hold-transfer line 204A, when activated by closing of the switch 94A, connects to the contact 206A and this contact is permanently connected via a line 210A to an arcuate conductor 212A that is concentric with an electrically connected angularly spaced apart series 214A of reset contacts, here equal in number (ten) to the counter wheel increments. The concentric arrangement of these contacts, as well as of others to be described, as to each selector switch 174A, B, C and D, is peculiar to the angular movement built into the selector for the blades 180A, B, C and D and members 182A, B, and C and, though commercially practicable, does not exclude other arrangements.

During the count from zero to ten, for example, the arcuate conductor 212A and the arcuate series 214A of reset contacts are, in the count position of the selector means 174, idle, but the bridging wiper 184A, via connecting the contacts 206A and 208A, establishes the arcuate series 214B as a feed to a second counter circuit 190B which includes a line 198B leading to the actuator 58B, establishing that second circuit so that after the counter wheel 36A reaches nine, the next impulse of the cam 200 closes the counter switch 194 to energize both actuators 58A and B. But the latter receives one pulse at this time, since, as the counter wheel 36A advances now to zero, the hold-transfer switch 94A is opened, thus nullifying the counter line 190B. However, as the counter wheel 36A ultimately advances through successive series of "nine" positions, incurring one increment of advance of the counter wheel 36B as a result of each "nine" position, the two wheels reach 99, at which time the hold-transfer switch 94B is closed to connect the line 198B via the pawls of the wheel 36B to a hold-transfer circuit 204B which leads back to a contact 206B that is permanently connected at 210B to the arcuate conductor 212B. Since the contact 206B is currently bridged by the wiper 184B with a contact 208B that is connected to a second arcuate series 214C of reset contacts, a third counter circuit is established at 190C to line 198C for the actuator 58C. At this time, the impulse means 200, by closing the counter switch 194, pulses all three actuators 58A, B and C and the counter reaches one-hundred, following which the counter wheels 36A and B, moving to zero, re-open their respective hold-transfer switches 94A and B. Ultimately, the counter wheel 36C will attain its "nine" position, along with the "nine" positions of the wheels 36A and B, to incur closing of its hold-transfer switch 94C, which will connect the actuator line 198C to a hold-transfer line 204C that leads back to a contact 206C permanently connected at 210C to the previously described arcuate conductor 212C and currently bridged by the wiper 184C for connection to a contact 208C of a fourth series 214D of reset contacts similar to those already referred to. This series 214D feeds a fourth counter circuit 190D which leads to the actuator 58D via a line 198D, and after the counter wheel 36D reaches its "nine" position, with the other wheels 36A, B and C of course in their "nine" positions, the counter will finally read 0000.

Although, upon this occurrence, the counter wheel 36D has closed its hold-transfer switch 94D to connect the actuator line 198D via 204D to an arcuate conductor 212D, no transfer function occurs, for the simple reason that the presently disclosed counter has only four wheels. However, as will ultimately appear, the switch 94D, line 204D and conductor 212D are not superfluous.

It might also be well to note here that successive transfers from one counter wheel to the next will occur, in the example here disclosed, only at 9, 99 and 999, and not at 9, 90 and 900, for example, because the count-transfer portions of the circuits are in series through the wipers 184A, B and C. That is, the switch 94A must be closed to establish an ultimate electrical connection via the line 198B to the normally open switch 94B, which requires that the counter wheel 36A be at nine before closing of the switch 94B will receive any current to feed to the next counter circuit 190C. The same is true of course as respects the dependency of the switch 94C on the "nine" position of the wheel 36B, and so on.

Another characteristic of the system is that the counter itself may be electrically disconnected at the end of count or at any number predetermined through the predetermining wheels, their switches 110A, B, C and D and predetermining circuit portions including a feed line 216 connected to the switch 110A and a line 218 connected to the last switch 110D and leading to a contact 220 which is connected by the wiper 186 to a contact 222. This contact is connected by a line 224 to one side of a normally closed switch 226, the other side of which is connected via a line 227 and a normally closed manual switch 228 to a solenoid 230 for controlling the switch 226. The opposite side of the solenoid is connected to the ground 172.

The switch 226 is mechanically connected at 234 to a second normally closed switch 236 which operates as a main switch for the entire counter since, when it is closed, it connects the source 170 via a line 171 to the feed line 188. The switches 226 and 236 operate simultaneously and are closed respectively across 224—227 and 170—171 when the solenoid 230 is deenergized. As will be seen, when the switch 236 breaks or opens at 170—171, the entire counter is cut out. It will be further apparent that the solenoid 230 is energizable by closure of all predetermining switches 110A, B, C and D, since these are in series. Hence, the predetermining circuit, controlling the solenoid 230, consequently controls the main or counter switch 236. The predetermining circuit may be isolated from the solenoid and hence from the aforesaid function by manually opening the switch 228, which is conveniently located on the control panel 24 (FIGURE 1).

The switch 236 serves another function, when closed across 170—171, in that it controls a suitable external load, symbolically indicated at 238 in FIGURE 14. For example, this load could be a lamp which would remain illuminated as long as the switch 236 is closed at 170—171, thus indicating that the main counter system is active.

Still a third function of the switch 236 is available in the sense that it controls an additional external load, symbolically represented at 242 in FIGURE 14. One side of this load is connected to ground and the other side to a contact 241 via a line 240. This contact is capable of being bridged by the switch 236 with a contact 243, connected to the source 170 by a line 232. That is, when the switch 236 is drawn upwardly by the solenoid 230, breaking at 170—171, it makes at 241—243 and activates the load 242. At this point it should be observed that the switch is of the make-before-break type, making at 241—243 before breaking at 110—111.

The switch 226 is likewise a make-before-break type, making a new circuit 245—247 to the solenoid 230 before breaking at 224—227, thus keeping the solenoid energized once it has been energized by the predetermining circuit. Deenergizing of the solenoid may be manually effected by the switch 228 to enable biased return of the switches 226 and 236 to their FIGURE 14 positions. Of course, as will be brought out below, subsequent changes in positions of one or more of the predetermining wheels will break the predetermining circuit by upsetting one or more of the predetermining switches 110 etc.

The foregoing description is based on the functions of the system with the selector means 174 in its count or CT–TR–PRD position, in which the selector switches 174A, B, C and D set up the following selector conductors: 180A via 190 to the counter circuit 190A; wiper 186 to the predetermining circuit via contacts 220 and 222 and wipers 184A, B and C to the count-transfer circuits for the remaining actuators 58B, C and D. The reset series 214B, C and D are used in the count-transfer circuits, but the reset series 214A and the reset arcuate conductors 212A, B, C and D are idle.

When the position of the selector means 174 is changed to Reset, the active conductors above described no longer function in the respects noted, but instead the blades 180A, B, C and D now extend across both of the respective reset arcuate conductors and reset series 212—214A, 212—214B, 212—214C and 212—214D. The wipers 186 and 184A, B and C are idle.

Now, since the blade 80A connects the line 188 via 188A to the arcuate reset series 214A and since that series is connected by a line 244 to the line 196—198A, the actuator 58A is pulsed once for each contact in the series 214A as the blade sweeps across the series. As will be obvious, there are as many contacts as there are positions or increments of the wheel 36A and accordingly the actuator 58A may be pulsed at least as many times as is necessary to reset the wheel 36A to zero. The blade 180B performs the same function as respects the actuator 58B and wheel 36B, acting through the former count-transfer circuit 190B via the reset series 214B, and the blades 180C and D do the same through the reset series 214C and D respectively via the former count-transfer circuits 190C and D respectively.

The counter wheels cannot be reset beyond zero by the reset means, because of the action of the hold switches 94A, B, C and D and hold circuits 204A, B, C and D, which, previously described as having a transfer function in counting, now serve a second function in the resetting operation. For example, as previously described, the hold switch 94A for the wheel 36A closes at the "nine" position of that wheel; hence, regardless of the position of the wheel 36A at the start of reset and regardless of the number of pulses given to the actuator 58A by the reset contacts, pulses in excess of those required to reset the wheel to zero are ineffective to cause deenergization of the actuator and hence the cocked drive mechanism or pawl 80 is retained in its cocked position until later. This desirable result is achieved through the closed hold switch 94A (closed at the "nine" position of the wheel 36A) and the hold-transfer circuit 204A which is connected to the contact 206A and this contact is in turn connected by 210A to the reset arcuate conductor 212A. Since this conductor is connected to the line 188A by the reset-positioned blade 180A, the circuit is completed to the source 170 and this circuit maintains a steady or "hold" current flow to the actuator 58A, keeping it energized. Since the actuator must be deenergized to advance the wheel 36A past nine, the hold circuit obviously prevents such advance.

The foregoing applies to the actuators 58B, C and D via the hold switches 94B, C and D and hold circuits 204B, C and D, since in each case the reset-positioned blades 180B, C and D connect the respective arcuate reset conductors 212B, C and D to the source 170. Now, when all wheels 36A, B, C and D are in their respective "nine" positions, the selector means will have been turned through the Reset phase or status and the blades 180A, B, C and D will leave the reset series 214A, B, C and D and the conductors 212A, B, C and D and will thus break the "hold" circuits to the actuators, whereupon the actuators will be deenergized and will thus simultaneously advance their respective wheels to zero. In short, the lines 240A, B and C and switches 94A, B and C, formerly functioning as transfer lines and switches, now function, along with the line 240D and switch 94D, as hold circuit means applying holding current to the pulsators or actuators for the purpose above outlined.

The resetting function just described is a remote function, which is in addition to the local or manual reset achievable by the rack and pinion means 118—116, which is a further demonstration of the versatility of the system. In addition to this, the counter may be preset remotely as well as locally, and this is accomplished from the panel 24 by means to be set forth immediately below, during which phase of operation the selector means 174 is now set in its preset or "PRST" position, the dial 178 being turned normally in the direction of the arrow (clockwise), which follows naturally from turning of the dial through the reset phase. However, whereas the system functions automatically to count with the selector means in its count position, and operates semi-automatically as the blades 180A, B, C and D sweep over the reset series 214A, B, C and D, the presetting function depends upon manual actuation of a plurality of preset switches 246A, B, C and D. Nevertheless, presetting is a procedure peculiar to manual or selective rather than automatic control and the ability of the system to accomplish this remotely is a distinct advantage. These switches are shown diagrammatically in FIGURE 14 and as buttons in FIGURE 1.

When the selector means 174 is turned to its preset position (PRST), the blades 180A, B, C and D respectively connect contacts 248A, B, C and D to the source 170 via the respective lines 188A, B, C and D, and these contacts lead via lines 250A, B, C and D, normally broken by the normally open preset switches 246A, B, C and D, to the actuators 58A, B, C and D via 198A, B, C and D. In other words, four preset circuits, normally open, are set up, one for each actuator. Hence, each time a preset switch is closed, it will pulse its actuator or pulsator and incur advance of its counter wheel. Although the hold-transfer circuits are inoperative during presetting, no significant advantage is lost because the presetting operation, being selective, is not dependent at all upon limiting advance of a counter wheel beyond any particular position such as nine or zero and all that the operator must keep in mind is that the counter wheel that he wishes to preset will advance once with each closure of the associated predetermining switch. In the customary presetting operation the counter will first be "cleared" by the resetting operation to return all counter wheels to zero, after which it is a simple operation to turn the selector means to PRST and pulse the desired actuators by the selected presetting button or switch 246A etc. In using the selector means 174 to achieve the preset position, the dial 178 is turned naturally from its count position, through its reset phase and is stopped at the preset position, automatically incurring clearing of the counter. Since the counting operation normally follows reset or preset, the selector means is then turned further clockwise and back to its count position. It will be understood that the selector means can pass through the preset position without affecting the cleared counter (all wheels at zero); provided, that the preset switches are not manipulated at the preset stage of the selector means. Inadvertent closing of the preset switches with the selector means 174 in any position other than preset is without effect on the counter, since the preset contacts 248A, B, C and D are not then connected to the source 170.

Predetermining is best initiated by first setting the counterwheels at the desired predetermining number and then manually turning the predetermining wheels until their respective dots register with the selected counter wheel digits, with, however, one significant observation, which will be outlined below as a characteristic of the type of actuation of the counter wheels on the deenergize strokes of the respective actuators 58A, etc. whereas the predetermining circuit is fed via 196—216 when the count switch 194 closes. That is to say, when the count switch closes it energizes, say, the actuator 58A but the counter wheel 36A is not moved until the actuator 58A is deenergized upon opening of the switch 194. Hence, the system actually records the count after the count occurs. As the count is recorded, the switch 194 is open and hence cannot feed the predetermining circuit until the next count pulse is received. In other words, the counter window will show a certain number as the switch 194 opens but the system will not simultaneously predetermine at that number because the predetermining circuit is dead. But the system will predetermine upon the next closure of the count switch 194 because that will feed the predetermining circuit via 216.

Now, in order that the system will predetermine according to the number finally appearing in the window 28, the number selcted on the counter wheels for predetermining must be the predetermining number minus one to accommodate completion of the predetermining circuit at the correct number. That is when the predetermining number minus one shows on the counter, the predetermining switches 110A, B, C and D will be closed but the switch 194 will be open. Hence, the next pulse from the switch 194 will complete the predetermining circuit to energize the solenoid 230 via the switch 226 across 224—227, even though at the instant the counter window shows the predetermining number minus one. However, as the main switch 236 is opened across 170—171 by the energized solenoid 230 (or as the count switch 194 re-opens), the deenergized actuator 58A will advance its wheel to the correct predetermining total. In other words, the system predetermines correctly but at the instant of predetermining gives advance notice of the imminence of predetermining by showing the predetermining number minus one in the window 28.

For example, suppose that the predetermining number desired is 0750. The typical procedure is to run the selector means 174 through its reset phase to clear the counter and then to set the selector means at PRST (preset) and manipulate the preset switches until the affected counter wheels present the number 0749 in the window 28. The window is then opened and the individual predetermining wheels are manually turned relative to the respective counter wheels until their respective dots 112 appear in the window, which means that all the predetermining switches 110A, B, C and D are closed. The counter is then cleared by the selector means 174, operating in its reset phase, returning all counter wheels to zero. The selector means is then set in its count position (CT–TR–PRD) and the counting operation is initiated. When the counter wheels are reset to 0000 the respective predetermining wheels, detented individually to the counter wheels, are turned back in angular increments corresponding to the respective number of the predetermining total minus one; i.e., the wheel 36A is turned back nine increments, the wheel 36B four, the wheel 36C seven and the wheel 36D ten increments, meaning that the predetermining switch 110D is closed and the predetermining switches 110C, B and A are respectively seven, four and nine increments from closing.

As the counting operation proceeds, the counter will ultimately show 0749 at the window 28, and the predetermining switches will now close. However, the predetermining circuit is not yet effective because 0749 is reached on deenergizing of the actuator 58A, which depends upon opening of the count switch 194. Since that switch is open, it cannot feed the otherwise completed predetermining circuit. Thus, it takes one more pulse (here the 750th) to energize the predetermining circuit but that 750th pulse does not in and of itself turn the counter wheel 36A: it merely cocks the drive means by energizing the actuator 58A. Therefore, the system correctly predetermines at 0750 even though for the instant the counter window shows 0759. Nevertheless, as soon as the main circuit is broken or the count switch opens, the deenergized actuators 58A and 58B turn the counter wheels 36A and 38B respectively to zero and five and the ultimate total reads 0750, the predetermining number. Since the main switch 236 is opened by the solenoid 230 in response to completion of the predetermining circuit, the counter will receive no further effective pulses.

As stated above, the predetermining function can be cut out at will by keeping the switch 228 open. If it is desired to predetermine at ten-thousand (the highest number available in the disclosed four-wheel counter) while leaving the switch 228 closed, the predetermining setting of 9999 may be set in by presetting all counter wheels to 9999 and then registering all predetermining wheel dots 112 in the window 28 and then resetting the counter to 0000. Then, upon the counting of 9999 pulses all predetermining switches 110A etc. will close and on the 10,000th pulse via 194 the predetermining circuit will close to open the main switch via the solenoid and the actuators 58A etc. will be energized. Upon deenergizing of the actuator 58A, etc. the counter will read 0000.

As for the presetting function, that is important in starting a new counter, for example, in a situation in which a count less than 9999 (per the four-digit example herein disclosed) has already been attained or is somehow otherwise known. The count and transfer operations as such are of course well known, but the novel way of accomplishing those operations is of significance here. Since all operations have been covered in the description, a separate detailed coverage of the modus operandi of each would be superfluous. In this description, as in the preliminary statement of objects, the important features, as well as subsidiary objects and features, have been stressed. Other objects and advantages will readily suggest themselves to those versed in the art, as will modifications and variations of the preferred embodiments illustrated and described, all of which may be achieved without departure from the spirit and scope of the invention.

What is claimed is:

1. In a counter, the combination of: a support; a rotatable shaft journaled on the support; a plurality of counter wheels journaled on the shaft for rotation relative to each other; a plurality of actuators, one for each wheel, for advancing the wheels individually, each actuator including a one-way drive mechanism effective to advance its wheel but enabling advance of the wheel independently of its actuator to overrun its said actuator so that one actuator is operative to advance its wheel in one direction and at least one other actuator is operative to advance its wheel in the opposite direction; a plurality of one-way clutch devices, one for each wheel, enabling the wheels to overrun the shaft in their respective advance directions when driven by the respective actuators but enabling the shaft to drive the wheels in their respective advance directions independently of the actuators to overrun the respective actuator drive mechanisms; and means for rotating the shaft first in one direction and then in the opposite direction to first turn one wheel in its advance direction via its clutch device and then to turn the other wheel in its advance direction via its clutch device.

2. The invention defined in claim 1, in which: the means for rotating and reversing the shaft includes a pinion fixed to the shaft and a rack meshing with the pinion and carried by the support for movement selectively in opposite directions from and back to a starting position.

3. The invention defined in claim 2, including: means limiting movement of the rack equally in opposite directions so that movement and reverse movement of the rack restores the shaft to its original position.

4. The invention defined in claim 2, including: releasable means for locking the rack in its starting position.

5. The invention defined in claim 4, including: means biasing the rack to move in one direction when the releasable means is released.

6. An electrical counter, comprising: a counter member advanceable through a cycle of successive positions; an electrical actuator for advancing the member; a source of electrical energy; a counter circuit connected to the actuator and including a counter switch for pulsing the actuator to advance the counter member; a reset circuit connected to the actuator and including a reset switch for pulsing the actuator to advance said member; selector means having a count position connecting the counter circuit to said source exclusively of the reset circuit and a reset position connecting the reset circuit to the source exclusively of the counter circuit; a hold circuit connected to the actuator and including a normally open hold switch closable in response to advance of the counter member to a predetermined position; and said selector means in its reset position being effective to connect said hold circuit steadily to said source so that when the member reaches said predetermined position and closes the hold switch the actuator is continuously energized to negative further pulsing thereof by the reset switch.

7. The invention defined in claim 6, in which: the reset circuit includes a series of spaced apart electrically connected contacts equal in number to the positions of the counter member; and the selector means includes a conductor operative in the reset position thereof to move successively from one contact to the next.

8. The invention defined in claim 6, including: a preset circuit connected to the actuator and including a preset switch for pulsing the actuator, said preset circuit being disconnected from said source in both the count and reset positions of the selector means; and said selector means having a preset position connecting the preset circuit to said source exclusively of the other circuits.

9. The invention defined in claim 6, including: a responder; a predetermining circuit connected to the responder and including a normally open predetermining switch; a predetermining member movable through a cycle and positioned corresponding to those of the counter member and having a starting position normally in register with that of the counter member; means interconnecting the members for movement in unison so that the position of the counter member normally determines the position of the predetermining member and accordingly determines closing of the predetermining switch; and said interconnecting means being forcibly releasable to enable selective change in the position of the predetermining member relative to the counter member for changing the time of closing of the predetermining switch.

10. The invention defined in claim 6, including: an additional counter member advanceable through a cycle of successive positions; an additional electrical actuator for advancing said additional member and connectible to the counter circuit via the hold circuit upon closing of the hold switch by the first-named counter member when the selector means is in its count position whereby said hold circuit serves as a transfer circuit to pulse both actuators after said closing of the hold switch.

11. The invention defined in claim 6, including: an additional member normally idle during advance of the first-named member; an additional electrical actuator for changing the idle status of said additional member and connectible to the counter circuit via the hold circuit upon closing of the hold switch by the first-named counter member when the selector means is in its count position whereby said hold circuit serves as a transfer circuit to pulse both actuators after said closing of the hold switch.

12. The invention defined in claim 11, including: means cocked by energizing of the first-named actuator and released by deenergizing of said first-named actuator to advance the first-named member whereby advance of said first-named member to its predetermined position is effected by release of said means to close the hold switch.

13. A counter, comprising: first, second and third coaxial counter wheels normally relatively rotatable in such directions that the first and third wheels rotate in one direction and the second wheel rotates in the opposite direction, each wheel being numbered in increasing count in the direction opposite to its normal direction of rotation when counting; and first, second and third actuators respectively for said first, second and third wheels, said first and third actuators being operative to rotate the first and third wheels in said one direction and said second actuator being operative to rotate the second wheel in said opposite direction, each actuator comprising a body and a drive member carried thereby for reciprocation along a straight-line path normal to the wheel axis and engageable with its respective wheel, and said actuators being arranged in nested relation, with the paths of the first and third actuator drive members at one side of the wheel axis and the path of the second actuator drive member at the diametrically opposite side of said wheel axis and parallel to the paths of said first and third members.

References Cited in the file of this patent

UNITED STATES PATENTS

| | | |
|---|---|---|
| 729,253 | Barr et al. | May 26, 1906 |
| 1,189,279 | Midgley | July 4, 1916 |
| 1,330,653 | Phinney | Feb. 10, 1920 |
| 1,902,066 | Fuller | Mar. 21, 1933 |
| 2,127,244 | Berck | Aug. 16, 1938 |
| 2,140,839 | Hennessy | Dec. 20, 1938 |
| 2,206,724 | Hilder | July 2, 1940 |
| 2,768,337 | Miller | Oct. 23, 1956 |
| 2,784,874 | Harper | Mar. 12, 1957 |
| 2,792,536 | Immel | May 14, 1957 |

FOREIGN PATENTS

| | | |
|---|---|---|
| 632,525 | France | Oct. 10, 1927 |